UNITED STATES PATENT OFFICE.

JOHN QUINLAN, OF DENVER, COLORADO.

LINIMENT.

SPECIFICATION forming part of Letters Patent No. 282,769, dated August 7, 1883.

Application filed May 25, 1883. (No specimens.)

*To all whom it may concern:*

Be it known that I, JOHN QUINLAN, a citizen of the United States, and resident of the city of Denver, county of Arapahoe, State of Colorado, have invented a new, useful, and effective Improvement in Liniments; and I do hereby declare the following to be a clear and exact description of the nature thereof sufficient to enable others skilled in the art to which it appertains to fully understand and use the same.

Its use is both for man and beast, and may be applied to man—viz., in cases of rheumatism, neuralgia, toothache, paralysis of even very old standing, corns, bunions, bruises, cuts, sprains, sores of recent or old standing, &c. To beasts it may be applied—viz., in cases of colic, distemper, swelling, pink-eye, lameness, corns, quittor, sprains and enlargements, galled backs and shoulders, foot-rot, for the preservation of the hoof, for sores of recent or old standing, &c. Its application is in the same manner and shape as liniments now practically in use, and in amount as may be deemed advisable by those familiar with the use and application of liniments in general.

My invention consists of a liniment of the oils, tinctures, spirits ammonia, ether, and acid, as more fully described hereinafter, to wit: the oils of amber, of juniper, of spike, of cedar, of hemlock, of origanum, raw linseed, white whale, of tar, and of black lubricating; the tinctures of the seed of *Datura stramonium*, (jimson-seed,) of iodine, of aconite-root, of belladonna, laudanum, of cantharides, of ginger, and of asafetida, the spirits of turpentine; furthermore, of aqua-ammonia, camphorated alcohol, sulphuric ether, and sulphuric acid.

In carrying out my invention I compose into a liniment the aforesaid ingredients in the manner and quantities as follows: I place into vat No. 1 thirty-six gallons of black lubricating-oil. Into vat No. 2, I place six gallons raw linseed-oil, three gallons of white-whale oil, two gallons of tar-oil, one pint of amber-oil, one pint of juniper-oil, one pint of spike-oil, one pint of cedar-oil, one pint of hemlock-oil, one pint of origanum-oil; also one pint of tincture of aconite-root, one pint of tincture of belladonna, one pint of laudanum, one pint of tincture of cantharides, one pint of tincture of ginger, one pint tincture of asafetida. Into vat No. 3, I place one-half gallon of aqua-ammonia and one pint of tincture of iodine. Stir well, and add them to contents in vat No. 2. I also add to contents in vat No. 2 one-half gallon camphorated alcohol, (which is obtained by dissolving one pound of camphor in such quantity of alcohol as to give one-half gallon of camphorated alcohol,) one-half gallon of the tincture of the seed of stramonium, (jimson-seed,) which is obtained by soaking, for three days, of one pound of the seed of stramonium in one-half gallon alcohol, which gives one-half gallon of the tincture of the seed of stramonium (jimson-seed) and one pint of sulphuric ether. Mix and stir the contents of vat No. 2 well and thoroughly, and pour under constant agitation to contents into vat No. 1. Furthermore, I combine, by slow agitation, one-half gallon of spirits of turpentine and one pint of sulphuric acid. After having been sufficiently cooled off, which takes from two to three hours, I add this also to contents in vat No. 1, stirring until well combined and mixed, thus giving the required composition or liniment of a semi-liquid consistence.

Having thus described my invention, what I claim as new and improved, and desire to secure by Letters Patent, is—

The composition or liniment consisting of the oils of amber, of juniper, of spike, of cedar, of hemlock, of origanum, raw linseed-oil, white-whale oil, oil of tar, and black lubricating-oil, the tinctures of the seed of stramonium, of iodine, of aconite-root, of belladonna, laudanum, of cantharides, of ginger, of asafetida, spirits of turpentine, aqua-ammonia, camphorated alcohol, sulphuric ether, and sulphuric acid in the quantities aforesaid.

JOHN QUINLAN.

Witnesses:
AD. KLINKENSPOR,
CHRISTIAN LE BERT.